(No Model.)

F. C. RUFFHEAD.
BACK BAND BUCKLE.

No. 541,687. Patented June 25, 1895.

Witnesses
Jno. G. Hinkel
Will E. Neff

Inventor
Fred C. Ruffhead
By J. H. Watson
Attorney.

UNITED STATES PATENT OFFICE.

FRED C. RUFFHEAD, OF ROCHESTER, NEW YORK, ASSIGNOR TO MORRIS F. CLARK AND FRED C. RUFFHEAD, OF SAME PLACE.

BACK-BAND BUCKLE.

SPECIFICATION forming part of Letters Patent No. 541,687, dated June 25, 1895.

Application filed April 19, 1895. Serial No. 546,299. (No model.)

*To all whom it may concern:*

Be it known that I, FRED C. RUFFHEAD, a citizen of the United States, residing at Rochester, in the county of Monroe and State of New York, have invented certain new and useful Improvements in Back-Band Buckles, of which the following is a specification.

In using back band buckles, such as that shown in Patent No. 531,336, issued to me jointly with W. F. Anthony, on December 25, 1894, I have found that the chain which is carried in the hook of the buckle often slips around behind the back of the hook and presses against the side of the mule or horse, which results in annoying and sometimes galling the animal. The object of this present invention is to remedy this defect, and the invention is therefore in the nature of an improvement on the buckle shown in the patent referred to.

I shall now proceed to describe the invention in detail, reference being had to the accompanying drawings, in which—

Figure 1:
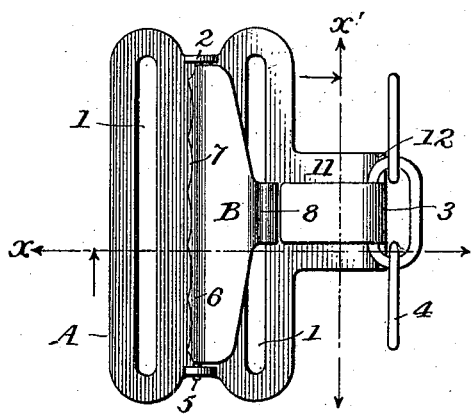
Figure 3:
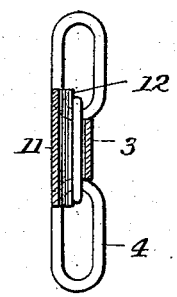
Figure 2:
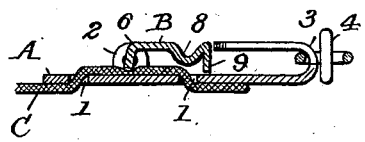
Figure 8:
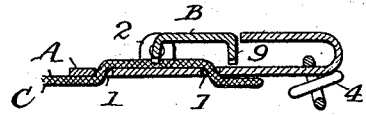
Figure 4:
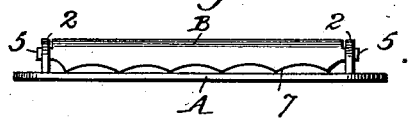
Figure 5:
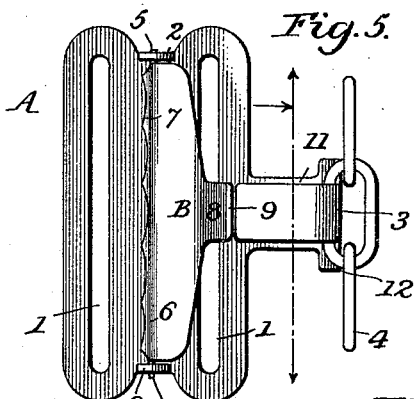
Figure 7:
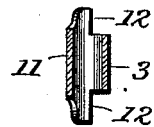
Figure 6:
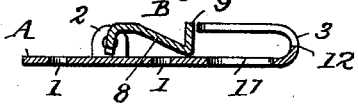

Figure 1 is a plan view of a buckle embodying the invention. Fig. 2 is a section on the line $x$ $x$ of Fig. 1. Fig. 3 is a section on the line $x'$ $x'$ of Fig. 1. Fig. 4 is a rear view of the buckle shown in Fig. 1. Fig. 5 is a plan view of a different form of buckle embodying my invention. Figs. 6 and 7 are sectional views taken respectively on the lines $y$ $y$ and $y'$ $y'$ of Fig. 5; and Fig. 8 is a sectional view of the old form of buckle, showing the manner in which the chain sometimes works in back of the hook and irritates the animal.

The buckle is made of two parts, a base plate or body-plate A and a wedging clamp B. The base plate is formed with slots 1, through which the back band C is passed, lugs 2, which are perforated to receive pintles on the wedging clamp, and a hook 3 in which the trace or chain of the plow harness is carried. The hook is formed from a solid tongue of metal which is integral with the base plate and is doubled or bent upon itself at or near its middle portion. As shown in some of the figures, the hook is passed through the link of a draft chain 4.

The wedging frame B is provided with pintles 5 by means of which it is pivoted in the lugs 2. On a line 6 nearly in line with the pintles, the frame is bent sharply down and at its lower edge is preferably provided with teeth 7 to prevent the buckle from slipping on the back band. On the side of the wedging frame opposite the teeth, it is reduced into a tongue 8, the end of which is bent to form a guard 9 for closing the mouth of the hook, the rear edge of the guard resting upon the base plate and forming a stop for the wedging clamp. In Figs. 2 and 6, I have shown the guard 9 as bent downward and upward respectively, but these are immaterial variations, the essential feature being that the guard shall lie across and close to the mouth of the hook so as to close it when the wedging frame is clamped upon the band, as shown in Fig. 2.

The free end of the wedging frame, or end which carries the guard, rests upon the base piece when the frame is closed, the base forming a stop to hold the guard in position in front of the hook.

As stated above, the present invention consists in a guard for preventing the link which rests in the hook from working around behind the hook.

In Fig. 8, I have shown the chain 4 in the position behind the hook which it sometimes assumes when back band buckles of the type shown in the Ruffhead and Anthony patent are used.

As shown in Fig. 1, the tongue 11 which forms the hook is wider in that portion extending from the body of the base plate to the bend than from the bend to the extremity of the hook. At the bend, and preferably about the middle of the bend, the change in width is abruptly made, thereby forming two offsets or shoulders 12 which serve as guards to prevent the chain from slipping up the back portion 11 of the hook. These shoulders 12 should extend so that the distance between their outer ends is greater than the opening of the link. By placing the shoulders at the middle of the bend, the chain is permitted to hang in its natural central position in the hook and at the same time prevented from bearing to an injurious extent against the sides of the animal.

The invention is susceptible of variations. The form shown in Fig. 1 is preferable because the back portion of the hook, being broad throughout its length, greatly strengthens the hook and gives it a greater bearing surface on the animal. In Figs. 5, 6 and 7, the rear portion 11 of the hook is narrower than in Fig. 1, but the guard shoulders 12 are in substantially the same position and project to about the same extent as those shown in Figs. 1 to 3 inclusive, the rear portion 11 being widened at the bend of the hook for this purpose.

It will be evident that a single guard at the bend of the hook will answer the purpose if sufficiently large. For the best effect, however, and for symmetry, it is better to have two guards, as shown.

In view of the various modifications of which the invention is susceptible, I do not limit my invention, in its broader aspect, to the precise construction and arrangement of parts illustrated and described.

What I claim is—

A back band buckle consisting of a base plate having one or more slots to receive a back band, lugs at its ends, a depending hook formed of a tongue of metal bent upon itself, and guards or shoulders projecting laterally from the hook at its bend; combined with a wedging clamp pivoted in the lugs of the base plate and having a tongue which is bent to form a guard constructed to lie across and adjacent to the opening of the hook and adapted to rest upon the base plate when the clamp is closed, substantially as described.

In testimony whereof I affix my signature in presence of two witnesses.

FRED C. RUFFHEAD.

Witnesses:
CHAS. A. WIDENER,
J. C. CULVER.